(12) United States Patent
Marchya et al.

(10) Patent No.: US 11,200,866 B1
(45) Date of Patent: Dec. 14, 2021

(54) LOW LATENCY COMPOSER

(71) Applicant: QUALCOMM Incorporated, San Diego, CA (US)

(72) Inventors: Dileep Marchya, Hyderabad (IN); Sudeep Ravi Kottilingal, San Diego, CA (US); Srinivas Pullakavi, Kakinada (IN); Dhaval Kanubhai Patel, San Diego, CA (US); Prashant Nukala, Hyderabad (IN); Nagamalleswararao Ganji, San Diego, CA (US); Mohammed Naseer Ahmed, San Diego, CA (US); Mahesh Aia, San Diego, CA (US); Kalyan Thota, Hyderabad (IN); Sushil Chauhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/176,767

(22) Filed: Feb. 16, 2021

(51) Int. Cl.
*G06T 1/20* (2006.01)
*G06T 1/60* (2006.01)
*G09G 5/00* (2006.01)

(52) U.S. Cl.
CPC ............... *G09G 5/003* (2013.01); *G06T 1/20* (2013.01); *G06T 1/60* (2013.01); *G09G 2360/18* (2013.01)

(58) Field of Classification Search
CPC . G06T 1/20; G06T 1/60; G09G 5/003; G09G 5/39; G09G 5/393; G09G 2360/18
USPC .................................................. 345/501, 545
See application file for complete search history.

(56) References Cited

U.S. PATENT DOCUMENTS

2017/0032764 A1* 2/2017 Radhakrishnan ......... G06T 1/60
2018/0189922 A1* 7/2018 Chinnadurai ............. G06T 1/20

* cited by examiner

*Primary Examiner* — Jacinta M Crawford
(74) *Attorney, Agent, or Firm* — Campbell C. Chiang; Patterson & Sheridan, LLP (57) ABSTRACT

In some aspects, the present disclosure provides a method for generating a frame. The method includes receiving a first fence indicating that a first frame stored in a display processor unit (DPU) buffer has been consumed by a hardware component. The method also includes in response to receiving the first fence, fetching a plurality of layers from an application buffer, the plurality of layers corresponding to a second frame. The method also includes determining to use both a DPU and a graphics processing unit (GPU) to process the plurality of layers for composition of the second frame. The method also includes fetching the first fence from the DPU buffer and generating a second fence.

30 Claims, 5 Drawing Sheets

LOW LATENCY COMPOSER

BACKGROUND

Field of the Disclosure

The teachings of the present disclosure relate generally to graphics and display operations, and more particularly, to techniques for generating a display frame.

Description of the Related Art

Computing devices often use a graphics processing unit (GPU) to accelerate the rendering of graphical data for display, and use a display processing unit (DPU) to process the graphical data to send to a display panel for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

An application executing on an electronic device may render several layers that are to be composited to generate a frame for display, such as on a monitor. In certain aspects, a DPU and a GPU generate the frame by, in part, compositing certain layers to generate the frame. In such aspects, GPU and DPU operations are often serialized such that the GPU performs and completes layer compositing before the DPU can begin compositing of other layers with the layers composited by the GPU. However, such serialization can results in relatively long idle times for the DPU and GPU, and other software and hardware components, and can also extend an amount of time required for completion of a frame.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include reduced latency in operations for generating a display frame.

Certain aspects relate to a method for generating a frame. The method includes receiving a first fence indicating that a first frame stored in a display processor unit (DPU) buffer has been consumed by a hardware component. The method also includes, in response to receiving the first fence, fetching a plurality of layers from an application buffer, the plurality of layers corresponding to a second frame. The method also includes determining to use both a DPU and a graphics processing unit (GPU) to process the plurality of layers for composition of the second frame. The method also includes, based on the determination to use the DPU and the GPU to process the plurality of layers: fetching the first fence from the DPU buffer, and generating a second fence. The method also includes initiating a GPU process for compositing one or more layers from a subset of the plurality of layers, the GPU process initiated in response to generating the second fence. The method also includes initiating a DPU process for compositing remaining layers of the plurality of layers and the one or more compo sited layers to generate the second frame, the DPU process initiated in response to fetching the first fence. The method also includes receiving a third fence indicating completion of the one or more composited layers. The method also includes, in response to receiving the third fence: fetching, by the DPU process, the one or more composited layers, and generating, by DPU process, the second frame based on the one or more composited layers and the remaining layers. The method also includes providing the second frame to the hardware component.

Certain aspects are directed to an apparatus configured for generating a frame. In some examples, the apparatus includes a memory and a processor coupled to the memory. In some examples, the processor and the memory are configured to receive a first fence indicating that a first frame stored in a display processor unit (DPU) buffer has been consumed by a hardware component. In some examples, the processor and the memory are configured to fetch, in response to receiving the first fence, a plurality of layers from an application buffer, the plurality of layers corresponding to a second frame. In some examples, the processor and the memory are configured to determine to use both a DPU and a graphics processing unit (GPU) to process the plurality of layers for composition of the second frame. In some examples, the processor and the memory are configured to, based on the determination to use the DPU and the GPU to process the plurality of layers: fetch the first fence from the DPU buffer, and generate a second fence. In some examples, the processor and the memory are configured to initiate a GPU process for compositing one or more layers from a subset of the plurality of layers, the GPU process initiated in response to generating the second fence. In some examples, the processor and the memory are configured to initiate a DPU process for compositing remaining layers of the plurality of layers and the one or more composited layers to generate the second frame, the DPU process initiated in response to fetching the first fence. In some examples, the processor and the memory are configured to receive a third fence indicating completion of the one or more composited layers. In some examples, the processor and the memory are configured to, in response to receiving the third fence: fetch, by the DPU process, the one or more composited layers, and generate, by DPU process, the second frame based on the one or more composited layers and the remaining layers. In some examples, the processor and the memory are configured to provide the second frame to the hardware component.

Certain aspects relate to an apparatus for generating a frame. In some examples, the apparatus includes means for receiving a first fence indicating that a first frame stored in a display processor unit (DPU) buffer has been consumed by a hardware component. In some examples, the apparatus includes means for fetching a plurality of layers from an application buffer in response to receiving the first fence, the plurality of layers corresponding to a second frame. In some examples, the apparatus includes means for determining to use both a DPU and a graphics processing unit (GPU) to process the plurality of layers for composition of the second frame. In some examples, the apparatus includes means for fetching the first fence from the DPU buffer based on the determination to use the DPU and the GPU to process the plurality of layers. In some examples, the apparatus includes means for generating a second fence based on the determination to use the DPU and the GPU to process the plurality of layers. In some examples, the apparatus includes means for initiating a GPU process for compositing one or more layers from a subset of the plurality of layers in response to generating the second fence. In some examples, the apparatus includes means for initiating a DPU process for compositing remaining layers of the plurality of layers and the one or more composited layers to generate the second frame, the DPU process initiated in response to fetching the first fence. In some examples, the apparatus includes means for receiving a third fence indicating completion of the one or more composited layers. In some examples, the apparatus includes means for fetching, by the DPU process, the one or more composited layers in response to receiving the third fence. In some examples, the apparatus includes means for generating, by DPU process, the second frame based on the one or more composited layers and the remaining layers in response to receiving the third fence. In some examples, the apparatus includes means for providing the second frame to the hardware component.

Certain aspects relate to a non-transitory computer-readable storage medium having instructions stored thereon for performing a method of generating a frame. In some examples, the method includes receiving a first fence indicating that a first frame stored in a display processor unit (DPU) buffer has been consumed by a hardware component. The method also includes, in response to receiving the first fence, fetching a plurality of layers from an application buffer, the plurality of layers corresponding to a second frame. The method also includes determining to use both a DPU and a graphics processing unit (GPU) to process the plurality of layers for composition of the second frame. The method also includes, based on the determination to use the DPU and the GPU to process the plurality of layers: fetching the first fence from the DPU buffer, and generating a second fence. The method also includes initiating a GPU process for compositing one or more layers from a subset of the plurality of layers, the GPU process initiated in response to generating the second fence. The method also includes initiating a DPU process for compositing remaining layers of the plurality of layers and the one or more composited layers to generate the second frame, the DPU process initiated in response to fetching the first fence. The method also includes receiving a third fence indicating completion of the one or more composited layers. The method also includes, in response to receiving the third fence: fetching, by the DPU process, the one or more composited layers, and generating, by DPU process, the second frame based on the one or more composited layers and the remaining layers. The method also includes providing the second frame to the hardware component.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

DETAILED DESCRIPTION

In certain aspects, a computing device may include a graphics processing unit (GPU) and a display processing unit (DPU) for supporting graphics and display functionality on the computing device and/or other peripheral devices such as a monitor or a printer.

As used herein, instances of the term "content" may refer to "layers of image data," "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit (GPU) or otherwise received by a display processing unit (DPU).

In some examples, as used herein, the term "display content" may refer to content generated by a processing unit configured to perform display processing. In some examples, as used herein, the term "display content" may refer to content generated by a display processing unit. Graphical content may be processed to become display content. For example, a GPU may output graphical content, such as a frame, to a buffer (which may be referred to as a framebuffer). A display processing unit may read the graphical content, such as one or more frames from the buffer, and perform one or more display processing techniques thereon to generate display content.

For example, a DPU may be configured to perform composition on one or more rendered layers to generate a frame. In some cases, a GPU may also be configured to perform composition on one or more rendered layers to generate a frame, such as when assisting DPU in doing the same. As another example, a DPU may be configured to compose, blend, or otherwise combine two or more layers together into a single frame. A DPU may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

As discussed, the GPU and the DPU may both be required to perform certain processes (e.g., composition of layers into a composite layer) to support the generation of a particular frame for display. However, generation of a frame using both the GPU and DPU may result in serialized processing which can create a relatively extended amount of idle time between the GPU and DPU, and as a result, extends the amount of time required to generate a frame.

For example, while the GPU generates a composite layer of a plurality of layers, the DPU and other components of the computing device may be waiting for the GPU to complete the composition before they can begin their own work. Such a configuration leaves the DPU and other components idle, and prolongs the process for frame generation. As such, aspects described herein are directed to techniques for reducing the serialization of processing between the GPU and DPU, and other components. Such techniques include methods for performing certain tasks in parallel to reduce the amount of idle time between systems and reduce the amount of time required to generate a frame.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or claims.

While features of the disclosure may be discussed relative to certain aspects and figures below, all aspects of the disclosure can include one or more of the advantageous features discussed herein. In other words, while one or more aspects may be discussed as having certain advantageous features, one or more of such features may also be used in accordance with various other aspects discussed herein.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects of the present disclosure. Such memory technologies/types include phase change memory (PRAM), dynamic random-access memory (DRAM), static random-access memory (SRAM), non-volatile random-access memory (NVRAM), flash memory (e.g., embedded multimedia card (eMMC) flash, flash erasable programmable read only memory (FEPROM)), pseudostatic random-access memory (PSRAM), double data rate (DDR) synchronous dynamic random-access memory (SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory.

Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, global positioning system (GPS) processors, display processors, etc.), complex memory systems, intricate electrical interconnections (e.g., buses and/or fabrics), and numerous other resources that execute complex and power intensive software applications (e.g., video streaming applications, etc.). Though certain aspects may described with respect to an SoC, it should be understood that the aspects may be applied to any suitable computing platform, such as having a GPU and DPU.

Figure 1:
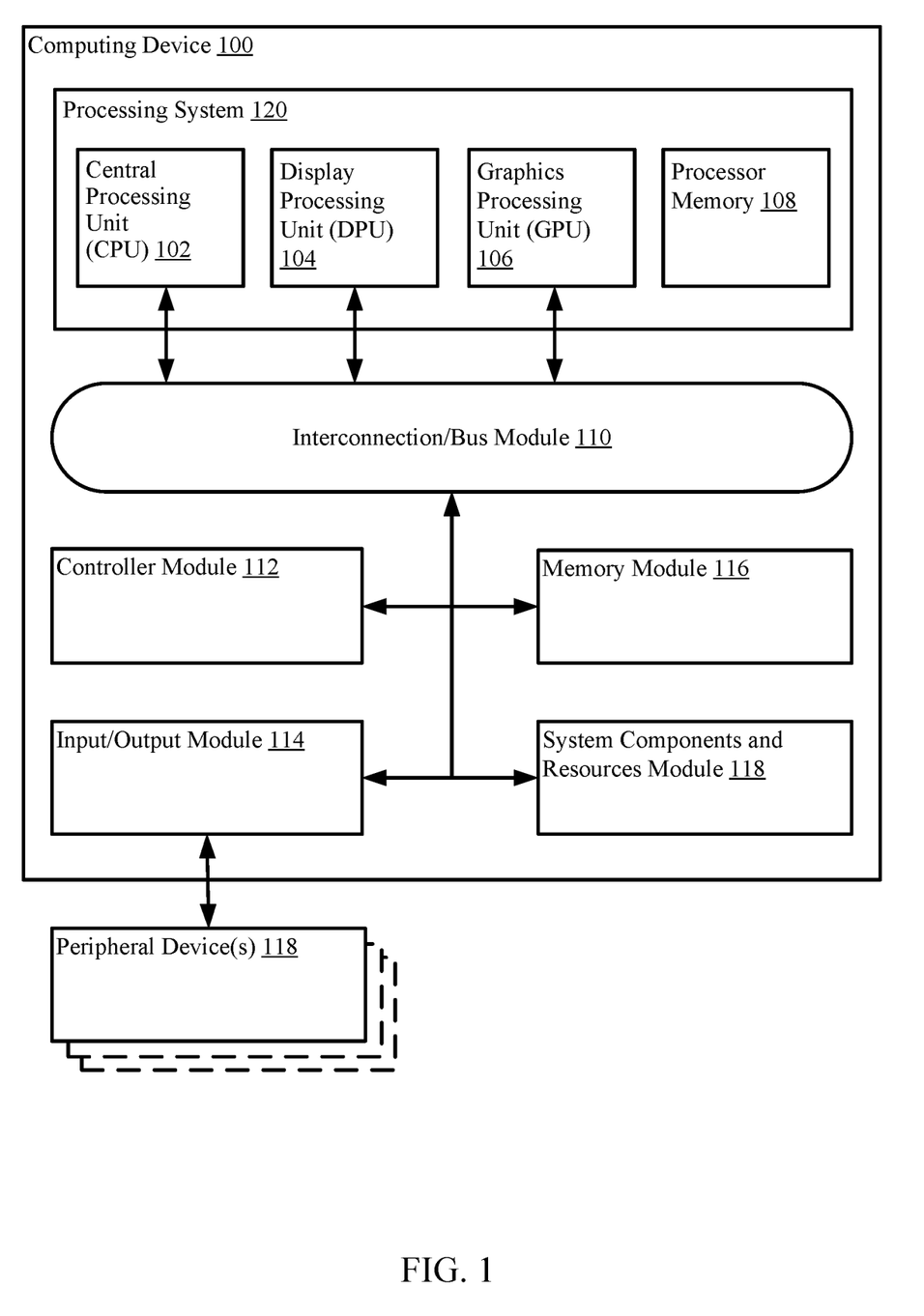
FIG. 1 is a block diagram illustrating an example computing device that may be used to implement the techniques described in this disclosure.

FIG. 1 is a block diagram illustrating an example computing device 100 that may be used to implement the techniques described in this disclosure. In some examples, computing device 100 may comprise an SoC. The SoC may contain circuitry for digital, analog, mixed-signal, and radio-frequency functions, and/or any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

In some examples, computing device 100 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a handheld device such as a portable video game device or a personal digital assistant (PDA), a personal music player, a video player, a display device, or any other type of device that generates, processes, and/or displays graphical data.

As illustrated in the example of FIG. 1, computing device 100 includes a processing system 120 that contains a plurality of heterogeneous processors (e.g., general/special purposed processors) such as a central processing unit (CPU) 102, a display processing unit (DPU) 104, and a graphics processing unit (GPU) 106. Although not shown, the processing system 120 may include additional processing units, for example digital signal processors (DSPs), application processors, etc.

As used herein, a processing unit may include one or more processors and any suitable support hardware and/or software (e.g., registers, combinational logic, controllers, etc.). The processing system 120 may include one or more cores, and each processor/core may perform operations independent of the other processors/cores. Processing units 102, 104, and 106 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The processing system 120 is interconnected with one or more controller module(s) 112, input/output (I/O) module(s) 114, memory module(s) 116, and system component and resources module(s) 118 via a bus module 110 which may include an array of reconfigurable logic gates and/or implement bus architecture (e.g., CoreConnect, advanced microcontroller bus architecture (AMBA), etc.). Bus module 110 communications may be provided by advanced interconnects, such as high performance networks on chip (NoCs). The interconnection/bus module 110 may include or provide a bus mastering system configured to grant components (e.g., processors, peripherals, etc.) exclusive control of the bus (e.g., to transfer data in burst mode, block transfer mode, etc.) for a set duration, number of operations, number of bytes, etc. In some cases, the bus module 110 may implement an arbitration scheme to prevent multiple master components from attempting to drive the bus simultaneously.

CPU 102 may comprise a general-purpose or a special-purpose processor that controls operation of computing device 100. A user may provide input via the I/O module 114 to computing device 100 to cause CPU 102 to execute one or more software applications. The software applications that execute on CPU 102 may include, for example, an operating system, a word processor application, an email application, a spreadsheet application, a media player application, a video game application, a graphical user interface application or another program. The user may provide input to computing device 100 via one or more input devices (not shown) such as a keyboard, a mouse, a microphone, a touch pad or another input device that is coupled to computing device 100 via the I/O module 114.

The software applications that execute on the CPU 102 may include one or more graphics rendering and/or compositing instructions that instruct the DPU 104 and GPU 106 to composite one or more layers (e.g., graphics data) for mixing and combining into a frame. In some examples, the software instructions may conform to a graphics application programming interface (API), such as, e.g., an open graphics library (OpenGL®) API, an open graphics library embedded systems (OpenGL ES) API, a Direct3D API, a DirectX API, a RenderMan API, a WebGL API, or any other public or proprietary graphics API. In order to process the graphics compositing instructions, CPU 102 may issue one or more commands to the DPU 104 and GPU 106 to cause the DPU 104 and GPU 106 to perform some or all of the rendering and/or compositing of one or more layers.

Similarly, the CPU 102 may include one or more instructions that cause the DPU 104 to receive and fetch image and/or video frames and/or layers from an application running on the CPU 102, or a memory or digital storage (e.g., the processor memory 108 or memory module 116). The DPU 104 may perform one or more image processing operations on the frames and layers, and output processed frames to a display device for display. Such image processing operations may include layer compositing, format converting, scaling, rotation, blending, layering of the image with additional graphics, and the like. In other words, the DPU 104 may obtain video and/or image data, and output values that cause the pixels of a display device to illuminate and display the video or image.

Controller module 112 facilitates the transfer of data going into and out of memory module 116. For example, controller module 112 may receive memory read requests and memory write requests from CPU 102, DPU 104, and/or GPU 106, and service such requests with respect to the memory module 116 and/or processor memory 108 in order to provide memory services for the components in computing device 100. Controller module 112 is communicatively coupled to memory module 116 and processor memory 108. Although controller module 112 is illustrated in the example computing device 100 of FIG. 1 as being a processing module that is separate from CPU 102, processor memory 108, and memory module 116, in other examples, some or all of the functionality of controller module 112 may be implemented on one or more of CPU 102, DPU 104, GPU 106, processor memory 108, and memory module 116.

Memory module 116 and processor memory 108 are computer-readable storage mediums implemented in the computing device 100. Memory module 116 may provide non-volatile storage, such as flash memory, for one or more of the processing system 120, controller module 112, I/O module 114, and/or the system components and resources module 118. The memory module 116 may include a cache memory and buffers to provide temporary storage of information. Memory module 116 may store program modules and/or instructions that are accessible for execution by CPU 102 and/or data for use by the programs executing on CPU 102. For example, memory module 116 may store user applications and graphics data. Memory module 116 may also store information for use by and/or generated by other components of computing device 100. For example, memory module 116 may act as a device memory for GPU 106 and DPU 104 and may store data to be operated on by GPU 106 and DPU 104, as well as data resulting from operations performed by GPU 106 and DPU 104. For example, memory module 116 may store any combination of path data, path segment data, surfaces, texture buffers, depth buffers, cell buffers, vertex buffers, frame buffers, or the like. In addition, memory module 116 may store command streams for processing by GPU 106 and/or DPU 104. It should be noted that memory module 116, in certain aspects, may refer to memory that is part of one or more of processors 102-106.

Processor memory 108 may contain instructions and/or data used by one or more of the CPU 102, the DPU 104, and the GPU 106. Processor memory 108 may be a local memory dedicated for use by processing system 120, such as a cache to other memory, scratchpad memory, or memory on an SoC that comprises the processing system 120. Processor memory 108 may be DRAM memory dedicated for use by the processing system 120.

The I/O module 114 is configured for communicating with resources external to the computing device 100. For example, the I/O module 114 includes an input/output interface (e.g., a bus architecture or interconnect) or a hardware design for performing specific functions (e.g., a memory, a wireless device, and a digital signal processor). In some examples, the I/O module 114 includes circuitry to interface with one or more peripheral devices 118, such as a memory or digital storage device located off-chip, a printer, a display device, etc. In one example, I/O module 114 is configured to retrieve rendered image data from a frame buffer (e.g., processor memory 108 or memory module 116) and configure a peripheral display device to display the image represented by the image data. In some examples, the I/O module 114 may include a digital-to-analog converter (DAC) that is configured to convert the digital values retrieved from the frame buffer into an analog signal consumable by a display. In other examples, I/O module 114 may pass the digital values directly to display for processing.

As discussed, the one or more peripheral devices 118 may include a display device or other hardware component (e.g., a printer). The display device may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. In some examples, such a display device may be integrated within a device that houses the computing device 100. For instance, the display device may be a screen of a mobile telephone handset or a tablet computer. Alternatively, the display device may be a stand-alone device coupled to a computing device via a wired or wireless communications link. For instance, the display device may be a computer monitor or flat panel display connected to a personal computer via a cable or wireless link.

The computing device 100 includes a system components and resources module 118 for managing sensor data, analog-to-digital conversions, wireless data transmissions, and for performing other specialized operations (e.g., supporting interoperability between different devices). System components and resources module 118 may also include components such as voltage regulators, oscillators, phase-locked loops, peripheral bridges, data controllers, system controllers, access ports, timers, and other similar components used to support the processors and software clients running on the computing device. The system components and resources 118 may also include circuitry for interfacing with peripheral devices, such as cameras, electronic displays, wireless communication devices, external memory chips, etc.

As will be described in more detail below, computing device 100 may be used for image processing in accordance with the systems and methods described herein. For example, a processing unit, such as CPU 102, DPU 104, GPU 106, and/or any other suitable processor, may be configured to receive a first fence indicating that a first frame stored in a display processor unit (DPU) buffer has been consumed by a hardware component. In response to receiving the first fence, the processor may also fetch a plurality of layers from an application buffer, the plurality of layers corresponding to a second frame. The processor may also determine to use both a DPU and a graphics processing unit (GPU) to process the plurality of layers for composition of the second frame. Based on the determination to use the DPU and the GPU to process the plurality of layers, the processor may fetch the first fence from the DPU buffer, and generate a second fence. The processor may also initiate a GPU process for compositing one or more layers from a subset of the plurality of layers, wherein the GPU process is initiated in response to generating the second fence. The processor may also initiate a DPU process for compositing remaining layers of the plurality of layers and the one or more composited layers to generate the second frame, wherein the DPU process is initiated in response to fetching the first fence. The processor may also receive a third fence indicating completion of the one or more composited layers. In response to receiving the third fence, the processor may also fetch, by the DPU process, the one or more composited layers, and generate, by DPU process, the second frame based on the one or more composited layers and the remaining layers. The processor may also provide the second frame to the hardware component.

Figure 2:
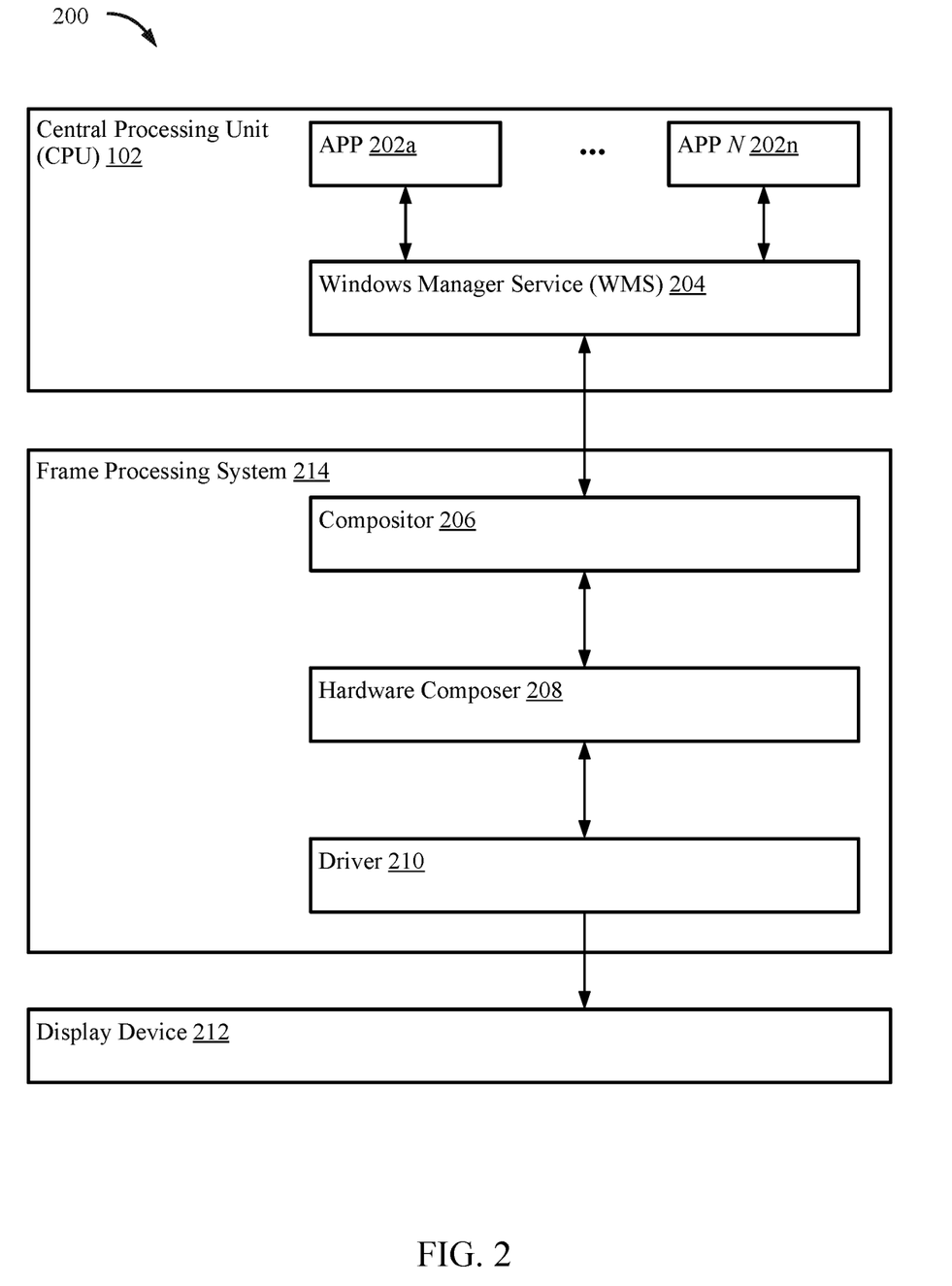
FIG. 2 is a block diagram illustrating an example display pipeline in accordance with certain aspects of the disclosure.

FIG. 2 is a block diagram illustrating an example display pipeline 200 in accordance with certain aspects of the disclosure. In some examples, the display pipeline 200 may be implemented on the computing device 100 of FIG. 1, or any other suitable computing system.

As discussed in more detail below, the exemplary display pipeline 200 provides an improved user experience and reduced processing time by providing for parallel DPU and GPU operations during frame processing. In some examples, a future GPU fence and a future DPU fence may be implemented to initiate and run GPU and DPU processes in parallel. As used herein, a "fence" may relate to a memory value corresponding to a buffer. For example, a fence may be configured to indicate when a particular buffer contains content (e.g., one or more layers or a frame) or when the content of a particular buffer is consumed (e.g., an indication that the buffer is now safe to reuse). In some examples, a DPU fence indicates when a buffer contains a frame or a composition of one or more layers, or when the buffer is empty and ready for use (e.g., the frame or composition has been consumed). In some examples, a GPU fence may indicate when a particular buffer contains a composition of one or more layers (e.g., an indication that a composition is complete) or when a particular buffer is empty and ready for use.

As illustrated, one or more applications 202a-202n (collectively referred to as "applications 202") may be executed on the CPU 102, and may communicate display data (e.g., one or more layers that are to be composited for a frame for display) with a windows manager service (WMS) 204. The WMS 204 is in communication with a compositor 206, which can pass data to a hardware (HW) composer 208. The HW composer 208 can pass data to a driver 210 (e.g., a direct rendering module (DRM) driver and/or kernel level driver) that interfaces with a display device 212. The compositor 206, hardware composer 208, and driver 210 are all part of a frame processing system 214, and may include hardware and software aspects of the computing device 100 of FIG. 1, such as the DPU 104 and the GPU 106.

The depiction of components in FIG. 2 is logical and is not necessarily intended to be a depiction of discrete components. For example, the division of the CPU 102, WMS 204, compositor 206, HW composer 208, and driver 210 in FIG. 1 is intended to convey different functions, but it is contemplated that two or more these components may be integrated into a construct (e.g., a DPU 104 and/or GPU 106 illustrated in FIG. 1). Moreover, the components may be realized by hardware, software in connection with hardware, firmware, or a combination thereof.

The WMS 204 generally functions to manage layers from different sources and determine how the layers are to be laid out on a display. The compositor 206 generally manages multiple layers generated by the application(s) 202. Although not required, the compositor 206 may be realized by a SurfaceFlinger module (or a derivative of the SurfaceFlinger module) of the ANDROID framework. In operation, for example, there may be many running applications with independent layers that are being rendered and composited. The compositor 206 determines what will be shown on the display and provides overlays as needed. An aspect of the role of the compositor 206 is to accept buffers of display data from multiple sources (e.g., the application(s) 202) and composite them for later display. The HW composer 208 may operate as a hardware abstraction layer (HAL) to perform composition using the DPU 104 and GPU 106. In general, the compositor 206 determines how to composite buffers with the available hardware on the computing device. In the context of an ANDROID-based device, the HW composer 208 may be realized using the ANDROID HW composer (or a derivative thereof). The driver 210 may be a kernel-level driver, and may contain low-level hardware-specific instructions to operating the underlying hardware of the display pipeline 200.

Figure 3:
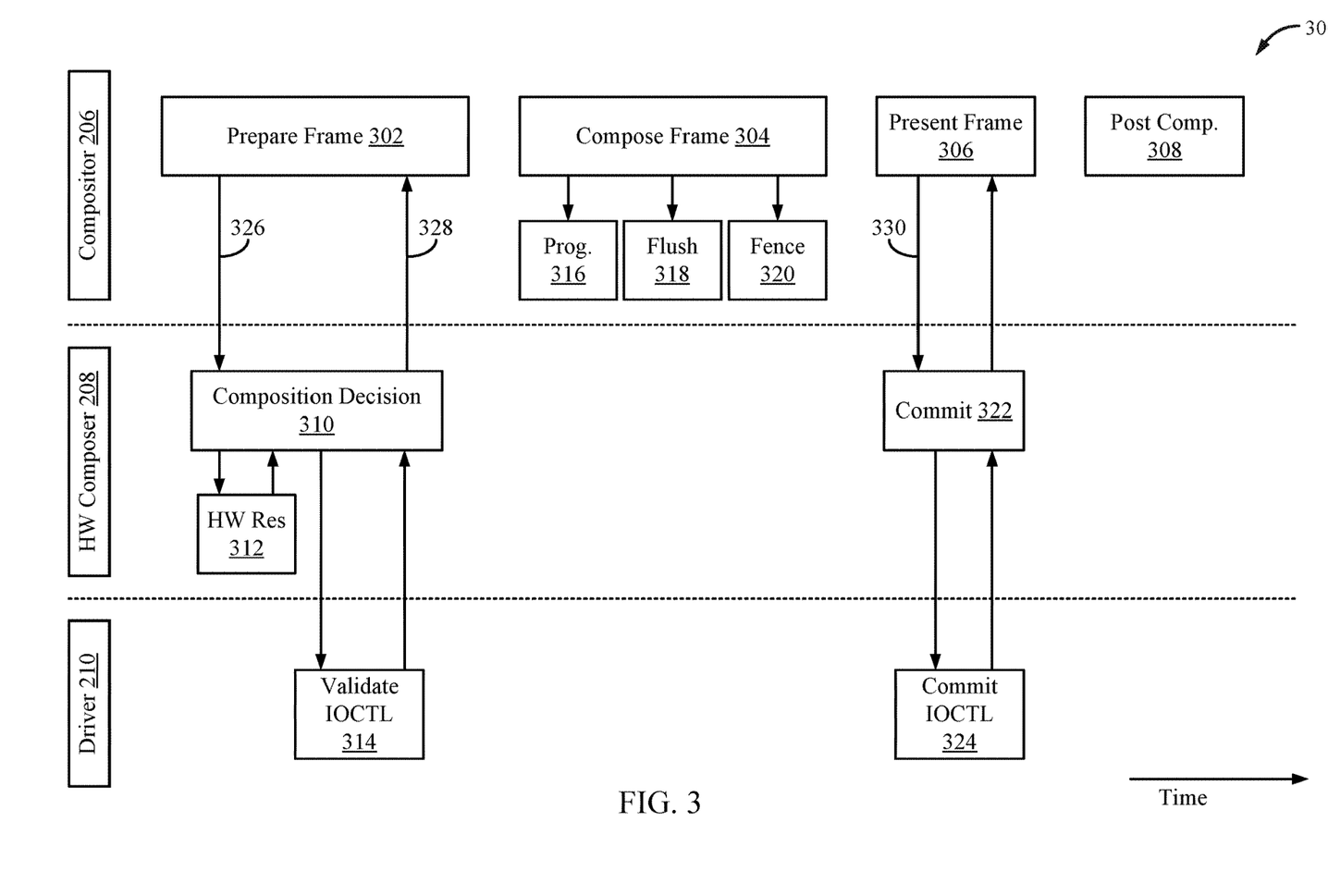
FIG. 3 is a block diagram illustrating a frame processing operation performed by the compositor, the hardware composer, and the driver of FIG. 2, according to certain aspects of the disclosure.

FIG. 3 is a block diagram illustrating a frame processing operation 300 performed by the compositor 206, the hardware composer 208, and driver 210 of FIG. 2, according to certain aspects of the disclosure. As illustrated, FIG. 3 includes four stages for processing a display frame, all of which are initiated by the compositor 206: (i) prepare frame 302 stage, (ii) compose frame 304 stage, (iii) present frame 306 stage, and (iv) post composition 308 stage.

In certain aspects, the stages of the frame processing operation 300 are performed in series. For example, the operation 300 may begin at the prepare frame 302 stage, then advance to the compose frame 304 stage after completion of the prepare frame 304 stage. Similarly, the operation 300 may advance to the present frame 306 stage after completion of the compose frame 304 stage. It should be noted that the stages of the operation 300 may be performed cyclically. For example, after the operation 300 generates a first frame for display, and the first frame is consumed by a panel (e.g., a display device), the DPU (e.g., DPU 104 of FIG. 1) may set a DPU fence to indicate to the compositor 206 that the content of a DPU buffer (e.g., the first frame) was consumed and the buffer is ready for reuse. Once the DPU fence is set, the compositor 206 may initiate the operation 300 at the prepare frame 302 stage to generate a second frame using a new set of one or more layers.

At the prepare frame 302 stage, the compositor 206 initiates the operation 300 to prepare a frame by sending a command 326 (e.g., "presentOrValidateDisplay" command) to the hardware (HW) composer 208. The command may include information identifying the application buffers that contain the layers to be composited and/or rendered for frame generation, information identifying the DPU/GPU fence(s) and corresponding DPU/GPU buffers that will be used during frame generation. The command 326 may also include other parameters, such as the number of layers to be processed for a frame.

In response to the command 326, the HW composer 208 may determine which of the one or more layers should be composited by GPU 106 and/or which of the one or more layers should be composited by the DPU 104 at the composition decision 310. As part of the composition decision 310, the HW composer 208 may determine limitations of HW resources 312. For example, the HW composer 208 may determine how many layers can be handled by DPU 104 for compositing. If there are too many layers for the DPU 104 to handle, then the surplus layers may be assigned to the GPU 106 for compositing. Accordingly, the HW composer 208 may determine that certain layers (e.g., layer x and layer y) will be composited by the DPU 104, while other layers (e.g., layer w and layer z) have to be composited by the GPU 106. As discussed in more detail below with regard to the compose frame 304 stage, the GPU 106 may first generate a composite of layer x and layer y prior to any compositing work performed by the DPU 104. The GPU 106 may then set a GPU fence that informs the compositor 206 of when the composite layer is ready (e.g., the GPU buffer contains the composite layer) which then prompts the DPU 104 to begin its compositing work. However, such serialization of compositing of layers can prolong idle time between the GPU and DPU, and can prolong the amount of time required to generate a frame.

During the composition decision 310, the driver 210 may validate an input/output control (IOCTL) 314. For example, the driver may ensure that the layers selected for handling by the DPU 104 and GPU 106 can actually be handled by the DPU 104 and GPU 106 hardware. In other words, validate IOCTL 314 is a loop that confirms layers can be processed by the DPU 104 and GPU 106 after assignment of layers by the HW composer 208. The HW composer 208 may then respond 328 to the command 326 by providing the compositor 206 with which of the layers should be compo sited by GPU 106 and/or which of the one or more layers should be composited by the DPU 104.

The compositor 206 may use an application programming interface (API) to communicate with the GPU 106 (e.g., schedule the GPU 106 and provide the GPU 106 with the layers to be composited). For example, the compositor may use an open graphics library (OpenGL) API to schedule 316 the GPU composition and program textures, coordinates, etc. After scheduling 316, the compositor 206 may flush 318, or clear a GPU fence corresponding to a GPU buffer that will be used by the GPU 106 to store the composite layer(s) after completion. By clearing the GPU fence, the GPU 106 indicates to the compositor 206 which GPU 106 buffer will be used to store the composite layer, and that the composite layer is not yet complete.

Once the GPU 106 completes the composite layer, the GPU 106 stores the composite layer in the GPU buffer and sets the GPU fence 320 to indicate to the compositor 206 that the composite layer is complete. It should be noted that the compositor 206 may wait until the GPU fence is set before initiating the present frame 306 stage. Accordingly, in terms of timing, the compositor 206 does not start the present frame 306 stage until after the GPU fence is set.

Once the GPU fence is set, the compositor 206 then initiates the present frame 306 stage. Here, the DPU 104 begins composition of the remaining layers, and rendering of a frame using the composite layers generated by both the DPU 104 and GPU 106. In some examples, the compositor 206 sends a command 330 (e.g., "presentDisplay") to the HW composer 208 which prompts the DPU 104 to begin the compositing and rendering work. The command 330 may include an identification of the GPU buffer that contains the composited layer generated by the GPU 106 so that the DPU 104 can fetch it.

In response to the command 330, the HW composer 208 may also initiate a commit 322 process, wherein programming of the overlay engine and pushing a completed frame out to the panel is performed. During the commit 322 process, the HW composer 208 may provide the driver 210 with information identifying any input buffers (e.g., GPU buffer containing a composite layer) and input fences (e.g., corresponding GPU fence) that the DPU 104 will need to complete the frame. Here, the driver 210 may perform a commit IOCTL 324 process, wherein the driver 210 provides the input buffers and input fences to the DPU 104, and the driver 210 provides output fences to the HW composer 208, which passes them to the compositor 206. In certain aspects, the output fences inform the compositor 206 that the frame has been completed and pushed to the panel. In some examples, the output fence is a DPU fence set by the DPU 104 and used by the compositor 206 to indicate the initiation of the next prepare frame 302 stage. At the post composition 308 stage, the frame is consumed and displayed at the display device. Upon consumption, the DPU 104 may set output fence which will notify the compositor 206 to restart the operation 300 (e.g., initiate the prepare frame 302 stage for another set of one or more layers).

Example Techniques for Parallel Processing of Layers by a DPU and a GPU

As shown in FIG. 3, processing of layers by the DPU 104 and GPU 106 is generally serialized. For example, the DPU 104 does not perform layer composition until after the GPU has completed layer composition (e.g., one or more layers are composited and stored in a GPU buffer, and the GPU fence is set to indicate completion of the composite layer to the compositor 206). This serialization of processing requires a longer time window for processing layers and generating frames relative to a parallel processing model, such as that illustrated in FIG. 4.

Figure 4:
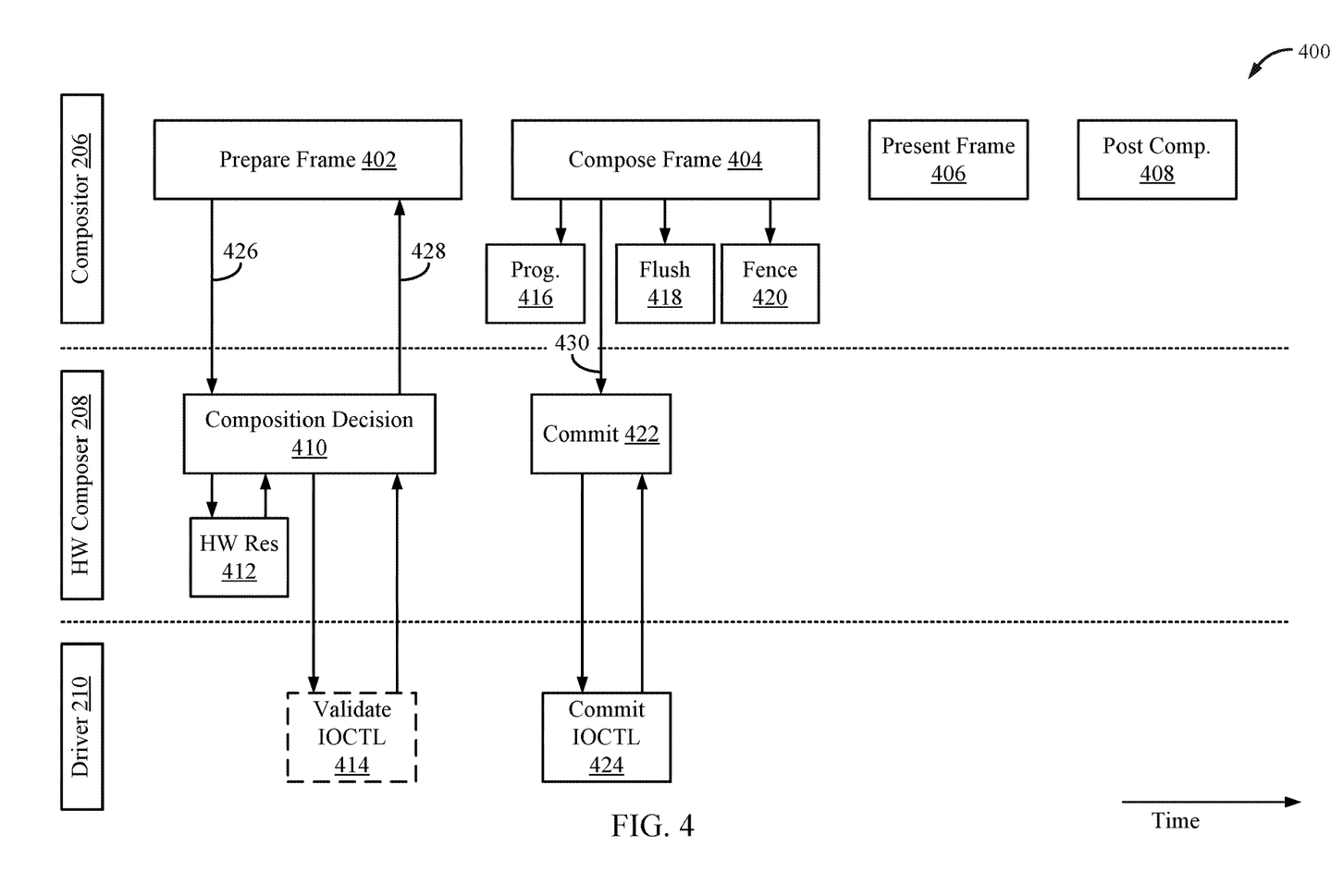
FIG. 4 is a block diagram illustrating a frame processing operation performed by the compositor, the hardware composer, and the driver of FIG. 2, according to certain aspects of the disclosure.

FIG. 4 is a block diagram illustrating a frame processing operation 400 performed by the compositor 206, the hardware composer 208, and the driver 210 of FIG. 2, according to certain aspects of the disclosure. More specifically, FIG. 4 illustrates a unified and anticipatory transaction model that is based on a futuristic fence and buffer exchange between the compositor 206 and both of the DPU 104 and GPU 106. The operations of FIG. 4 maximize parallelism and significantly increase time available for the GPU 106 and DPU 104 to process layers and a frame. In certain aspects, a futuristic fence is created before any actual hardware programming, and the future fence is later bound to an actual fence associated with the actual hardware operation. In some examples, the futuristic fence is built on top of a portable operating system interface (POSIX) memory barrier and fence specification that is backwards compatible with legacy systems.

In certain aspects, the operation 400 utilizes a unified mode configured to convert earlier synchronization events to futuristic fences. For example, the present frame 306 stage of FIG. 3 occurs after the compose frame 304 stage because the compositor 206 is waiting on the GPU fence to indicate that the GPU 106 has completed the composite layer before the compositor 206 can issue the command 330 to schedule the DPU 104. However, in unified mode, the HW composer 208 can determine which GPU buffer and DPU buffer were previously used for a composite layer and frame, respectively, and can present a future GPU fence and a future DPU fence to the compositor 206 so that the compositor 206 can provide parallel instructions for processing a frame to the DPU 104 and GPU 106. By parallelizing the instructions for the DPU 104 and GPU 106, the amount of time to process a frame can be significantly reduced.

More specifically, a future GPU fence received by the compositor 206 at the prepare frame 402 stage will cause the compositor 206 to send instructions to the HW composer 208 to initiate DPU 104 compositing of layers while the GPU 106 is still compositing its layers and before the GPU 106 sets the actual GPU fence. Accordingly, both of the DPU 104 and the GPU 106 can operate in parallel, meaning that the DPU 104 can complete its processing of layers that it was assigned (e.g., compositing DPU 104 assigned layers) while the GPU 106 completes composition of its own assigned layers. Consequently, the HW composer 208 can generate and provide a future DPU fence to the compositor 206 after the DPU 104 and GPU 106 have been scheduled for layer composition, and prior to either of the DPU 104 and GPU 106 completing their layer composition and frame processing. As such, the compositor 206 is no longer required to wait until the DPU 104 has completed frame processing to schedule compositing of the next set of layers. This allows the compositor 206 to initiate the prepare frame 402 stage much earlier, and also allows the compositor 206 to perform the compose frame 404 stage in parallel with the HW composer's 206 commit 422 stage. Thus, the reduced amount of time for layer and frame processing improves user experience as well as processor performance. A more detailed discussion of the operation 400 is as follows.

Initially, the compositor 206 receives a future DPU fence from the HW composer 208 during a commit 422 procedure for a first set of layers of a first frame. In response to the future DPU fence, the compositor 206 sends a command 426 (e.g., presentOrValidateDisplay) to the HW composer 208 to schedule the GPU 106 and DPU 104 for compositing a second set of layers of a second frame. In certain aspects, at the prepare frame 402 stage, the compositor 206 generates a future GPU fence based on a previous (e.g., cached) fence used by the GPU 106. The cached fence may include information identifying which GPU buffer was previously used. In some examples, the compositor 206 may use the cached fence as the future GPU fence, and include information about the cached fence in the command 426.

In response to the command 426, the HW composer 208 may perform a composition decision 410 and determine limitations of HW resources 412, as discussed above with regard to FIG. 3. Note that the driver 210 may no longer be required to perform a validate IOCTL 414 stage because the future GPU fence can be used by the HW composer 208 to validate a committal of certain layers to the DPU 104 and GPU 106. However, in certain aspects, the driver 210 may perform the validate IOCTL 414 stage as a failsafe mechanism.

During the composition decision 410 stage, the HW composer 208 may fetch or receive cached DPU fences to be used as future DPU fences, and pass the future DPU fences to the compositor 206 with information indicating which DPU buffer is associated with the future DPU fence. In a response 428 to the command 426, the HW composer 208 may provide the compositor 206 with the future DPU fences and an indication of which layers should be processed by GPU 106 and which layers should be processed by the DPU 104.

Here, because the compositor 206 has a future GPU fence and knows which layers will be processed by GPU 106 and which layers will be processed by the DPU 104, the compositor 206 can instruct the HW composer 208 to initiate the commit 422 process and commit IOCTL 424 process by the driver 210, while the compositor 206 performs the compose frame 404 stage. Accordingly, when the compositor 206 schedules 416 the GPU 106 for layer composition, the compositor 206 may also send a command 430 (e.g., "presentDisplay") to the HW composer 208 to begin the commit 422 process, wherein the command 430 may include an identification of the future GPU fence and corresponding GPU buffer.

As discussed above, the compositor 206 may proceed to flush 418, or clear the GPU fence of the GPU buffer that corresponds to the future GPU fence. Once the GPU 106 completes the composite layer it was scheduled to generate, the layer is stored in the GPU buffer and an actual GPU fence is set 420 to indicate completion of the composite layer to the compositor 206. Here, the future GPU fence may provide two things: an indication for the compositor 206 to wait for a specific period of time (e.g., a wait here and forward), and an indication for the compositor 206 to act or perform a specific action when the actual GPU fence is signaled. In some examples, the weight of the future GPU fence may be one or more seconds, because one or more seconds is a relatively long time to a processor performing operations (e.g., operation 400). Thus, the future GPU fence can be given a weight that will most likely not expire prior to the actual GPU fence being signaled. Accordingly, the future GPU fence will exist and be used to schedule 416 the GPU 106 until the actual GPU fence is signaled, at which point the future GPU fence will bind to (e.g., replace) the actual GPU fence.

The compositor 206 may then pass the actual GPU fence and an indication of the corresponding GPU buffer to the HW composer 208 so that the DPU 104 can fetch the layer composited by the GPU 106 and complete the second frame. Here, because the DPU 104 began compositing layers prior to the GPU 106 completing its composited layer, the DPU 104 can complete the second frame relatively sooner. Once the second frame is completed, the driver 210 may provide the HW composer 208 with an actual DPU fence and corresponding DPU buffer that contains the second frame. Similar to the future GPU fence, the actual DPU fence may bind to the future DPU fence. Thus, when a third set of layers is subsequently received for a third frame, the HW composer 208 may utilize the cached actual DPU fence used for the second frame as a future DPU fence for the third frame. Operations 400 may then proceed to present frame 406 and post composition 408 steps for the second frame.

Figure 5:
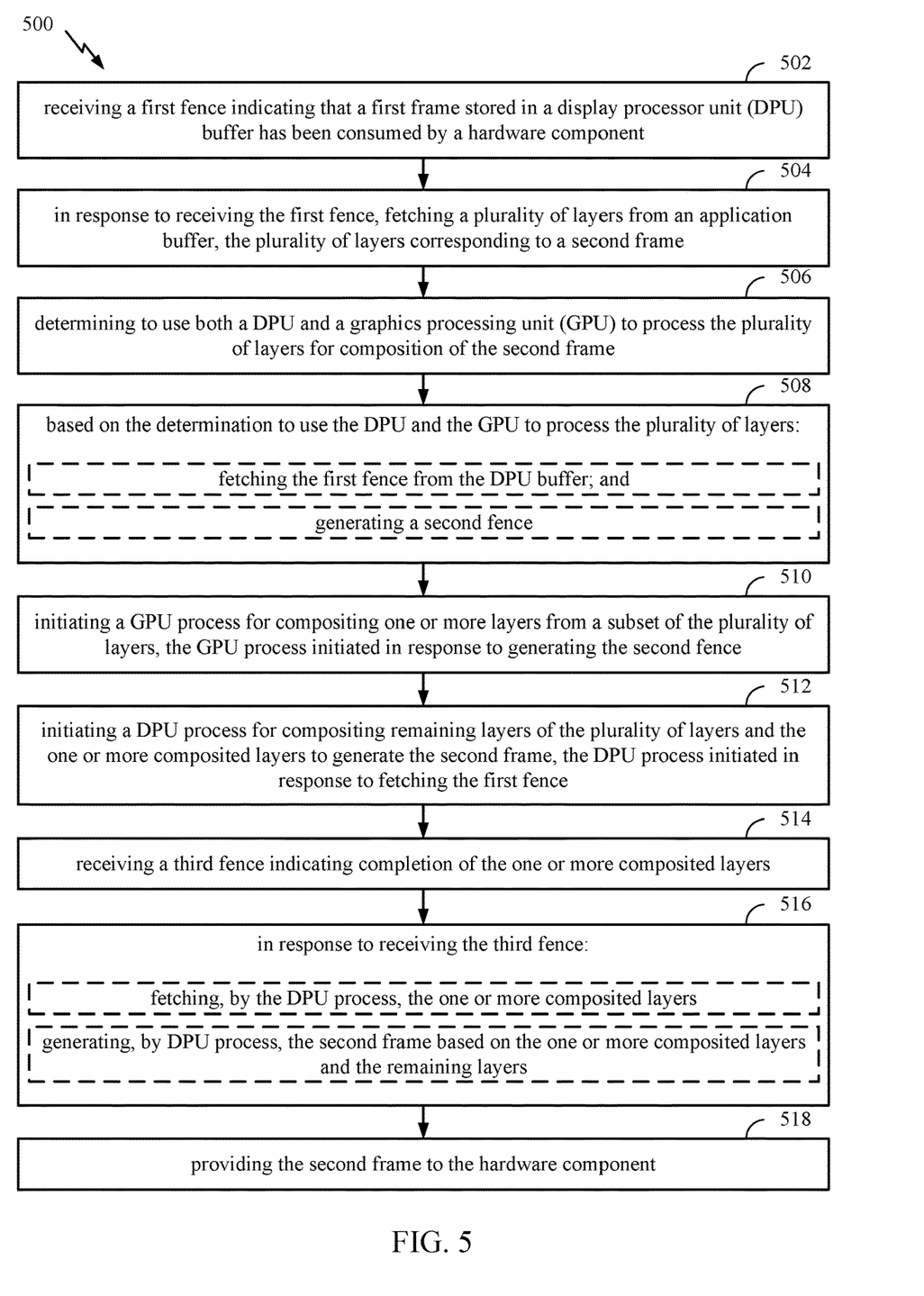
FIG. 5 is a flow chart illustrating example operations for generating a frame for display, according to certain aspects of the disclosure.

FIG. 5 is a flow chart illustrating example operations 500 for generating a frame for display. In certain aspects within the scope of the present disclosure, the operations 500 may be operational by a general purpose processor, or any one or more of the processors in the processing system 120 as described above and illustrated in FIG. 1, or any other suitable means for carrying out the described functions. The specific order of steps or blocks shown in FIG. 5 is exemplary in nature, and in various aspects of the disclosure, these steps or blocks may occur in any suitable order, with some examples including two or more steps or blocks occurring simultaneously.

In this example, the operations 500 start at a first block 502 by receiving a first fence indicating that a first frame stored in a display processor unit (DPU) buffer has been consumed by a hardware component.

The operations 500 then proceed to block 504 by, in response to receiving the first fence, fetching a plurality of layers from an application buffer, the plurality of layers corresponding to a second frame.

The operations 500 then proceed to block 506 by determining to use both a DPU and a graphics processing unit (GPU) to process the plurality of layers for composition of the second frame.

The operations 500 then proceed to block 508 by, based on the determination to use the DPU and the GPU to process the plurality of layers: fetching the first fence from the DPU buffer, and generating a second fence.

The operations 500 then proceed to block 510 by initiating a GPU process for compositing one or more layers from a subset of the plurality of layers, the GPU process initiated in response to generating the second fence.

The operations 500 then proceed to block 512 by initiating a DPU process for compositing remaining layers of the plurality of layers and the one or more composited layers to generate the second frame, the DPU process initiated in response to fetching the first fence.

The operations 500 then proceed to block 514 by receiving a third fence indicating completion of the one or more composited layers.

The operations 500 then proceed to block 516 by, in response to receiving the third fence: fetching, by the DPU process, the one or more composited layers, and generating, by DPU process, the second frame based on the one or more composited layers and the remaining layers.

The operations 500 then proceed to block 518 by providing the second frame to the hardware component.

In certain aspects, initiating the GPU process comprises configuring GPU parameters for compositing the one or more layers prior to the GPU process, and wherein initiating the DPU process comprises configuring DPU parameters for compositing the remaining layers of the plurality of layers and the one or more composited layers prior to the DPU process.

In certain aspects, the second fence comprises a time duration indicative of a period during which the compositing of the one or more layers is pending, and wherein the third fence is configured to interrupt the period and initiate the compositing of the one or more layers.

In certain aspects, determining to use both the DPU and the GPU to process the plurality of layers for composition of the second frame further comprises determining which of the plurality of layers form the subset of the plurality of layers.

In certain aspects, generating the second frame further comprises: storing the second frame in the DPU buffer; and setting a fourth fence indicating release of the second frame by the DPU.

In certain aspects, the first fence is a memory value set by the DPU indicating release of the first frame by the DPU.

In certain aspects, the third fence is received during initiating the DPU process.

In certain aspects, receiving the third fence indicating completion of the one or more composited layers further comprises receiving an indication of one or more GPU buffers that contain the one or more composited layers, and wherein fetching the one or more composited layers further comprises fetching the one or more composited layers from the one or more GPU buffers.

Example Aspects

Implementation examples are described in the following numbered clauses:

1. A method for generating a frame, comprising: receiving a first fence indicating that a first frame stored in a display processor unit (DPU) buffer has been consumed by a hardware component; in response to receiving the first fence, fetching a plurality of layers from an application buffer, the plurality of layers corresponding to a second frame; determining to use both a DPU and a graphics processing unit (GPU) to process the plurality of layers for composition of the second frame; based on the determination to use the DPU and the GPU to process the plurality of layers: fetching the first fence from the DPU buffer; and generating a second fence; initiating a GPU process for compositing one or more layers from a subset of the plurality of layers, the GPU process initiated in response to generating the second fence; initiating a DPU process for compositing remaining layers of the plurality of layers and the one or more composited layers to generate the second frame, the DPU process initiated in response to fetching the first fence; receiving a third fence indicating completion of the one or more composited layers; in response to receiving the third fence: fetching, by the DPU process, the one or more composited layers; and generating, by DPU process, the second frame based on the one or more composited layers and the remaining layers; and providing the second frame to the hardware component.

2. The method of aspect 1, wherein initiating the GPU process comprises configuring GPU parameters for compositing the one or more layers prior to the GPU process, and wherein initiating the DPU process comprises configuring DPU parameters for compositing the remaining layers of the plurality of layers and the one or more composited layers prior to the DPU process.

3. The method of any of aspects 1 and 2, wherein the second fence comprises a time duration indicative of a period during which the compositing of the one or more layers is pending, and wherein the third fence is configured to interrupt the period and initiate the compositing of the one or more layers.

4. The method of any of aspects 1-3, wherein determining to use both the DPU and the GPU to process the plurality of layers for composition of the second frame further comprises determining which of the plurality of layers form the subset of the plurality of layers.

5. The method of any of aspects 1-4, wherein generating the second frame further comprises: storing the second frame in the DPU buffer; and setting a fourth fence indicating release of the second frame by the DPU.

6. The method of any of aspects 1-5, wherein the first fence is a memory value set by the DPU indicating release of the first frame by the DPU.

7. The method of any of aspects 1-6, wherein the third fence is received during initiating the DPU process.

8. The method of any of aspects 1-7, wherein receiving the third fence indicating completion of the one or more composited layers further comprises receiving an indication of one or more GPU buffers that contain the one or more composited layers, and wherein fetching the one or more composited layers further comprises fetching the one or more composited layers from the one or more GPU buffers.

9. An apparatus configured for generating a frame, the apparatus comprising: a memory; and a processor coupled to the memory, the processor and the memory configured to: receive a first fence indicating that a first frame stored in a display processor unit (DPU) buffer has been consumed by a hardware component; fetch, in response to receiving the first fence, a plurality of layers from an application buffer, the plurality of layers corresponding to a second frame; determine to use both a DPU and a graphics processing unit (GPU) to process the plurality of layers for composition of the second frame; based on the determination to use the DPU and the GPU to process the plurality of layers: fetch the first fence from the DPU buffer; and generate a second fence; initiate a GPU process for compositing one or more layers from a subset of the plurality of layers, the GPU process initiated in response to generating the second fence; initiate a DPU process for compositing remaining layers of the plurality of layers and the one or more composited layers to generate the second frame, the DPU process initiated in response to fetching the first fence; and receive a third fence indicating completion of the one or more composited layers; in response to receiving the third fence: fetch, by the DPU process, the one or more composited layers; and generate, by DPU process, the second frame based on the one or more composited layers and the remaining layers; and provide the second frame to the hardware component.

10. The apparatus of aspect 9, wherein the processor and the memory, being configured to initiate the GPU process, are further configured to determine GPU parameters for compositing the one or more layers prior to the GPU process, and wherein the processor and the memory, being configured to initiate the DPU process, are further configured to determine DPU parameters for compositing the remaining layers of the plurality of layers and the one or more composited layers prior to the DPU process.

11. The apparatus of any of aspects 9 and 10, wherein the second fence comprises a time duration indicative of a period during which the compositing of the one or more layers is pending, and wherein the third fence is configured to interrupt the period and initiate the compositing of the one or more layers.

12. The apparatus of any of aspects 9-11, wherein the processor and the memory, being configured to determine to use both the DPU and the GPU to process the plurality of layers for composition of the second frame, are further configured to determine which of the plurality of layers form the subset of the plurality of layers.

13. The apparatus of any of aspects 9-12, wherein the processor and the memory, being configured to generate the second frame, are further configured to: store the second frame in the DPU buffer; and set a fourth fence indicating release of the second frame by the DPU.

14. The apparatus of any of aspects 9-13, wherein the first fence is a memory value set by the DPU indicating release of the first frame by the DPU.

15. The apparatus of any of aspects 9-14, wherein the third fence is received during initiating the DPU process.

16. The apparatus of any of aspects 9-15, wherein the processor and the memory, being configured to receive the third fence indicating completion of the one or more composited layers, are further configured to receive an indication of one or more GPU buffers that contain the one or more composited layers, and wherein the processor and the memory, being configured to fetch the one or more composited layers, are further configured to fetch the one or more composited layers from the one or more GPU buffers.

17. An apparatus for generating a frame, the apparatus comprising: means for receiving a first fence indicating that a first frame stored in a display processor unit (DPU) buffer has been consumed by a hardware component; means for fetching a plurality of layers from an application buffer in response to receiving the first fence, the plurality of layers corresponding to a second frame; means for determining to use both a DPU and a graphics processing unit (GPU) to process the plurality of layers for composition of the second frame; means for fetching the first fence from the DPU buffer based on the determination to use the DPU and the GPU to process the plurality of layers; means for generating a second fence based on the determination to use the DPU and the GPU to process the plurality of layers; means for initiating a GPU process for compositing one or more layers from a subset of the plurality of layers in response to generating the second fence; means for initiating a DPU process for compositing remaining layers of the plurality of layers and the one or more composited layers to generate the second frame, the DPU process initiated in response to fetching the first fence; means for receiving a third fence indicating completion of the one or more composited layers; means for fetching, by the DPU process, the one or more composited layers in response to receiving the third fence; means for generating, by DPU process, the second frame based on the one or more composited layers and the remaining layers in response to receiving the third fence; and means for providing the second frame to the hardware component.

18. The apparatus of aspect 17, wherein the means for initiating the GPU process comprises means for configuring GPU parameters for compositing the one or more layers prior to the GPU process, and wherein the means for initiating the DPU process comprises means for configuring DPU parameters for compositing the remaining layers of the plurality of layers and the one or more composited layers prior to the DPU process.

19. The apparatus of any of aspects 17 and 18, wherein the second fence comprises a time duration indicative of a period during which the compositing of the one or more layers is pending, and wherein the third fence is configured to interrupt the period and initiate the compositing of the one or more layers.

20. The apparatus of any of aspects 17-19, wherein the means for determining to use both the DPU and the GPU to process the plurality of layers for composition of the second frame further comprises means for determining which of the plurality of layers form the subset of the plurality of layers.

21. The apparatus of any of aspects 17-20, wherein the means for generating the second frame further comprises: means for storing the second frame in the DPU buffer; and means for setting a fourth fence indicating release of the second frame by the DPU.

22. The apparatus of any of aspects 17-21, wherein the first fence is a memory value set by the DPU indicating release of the first frame by the DPU.

23. The apparatus of any of aspects 17-22, further comprising means for receiving the third fence during initiating the DPU process.

24. The apparatus of any of aspects 17-23, wherein the means for receiving the third fence indicating completion of the one or more composited layers further comprises means for receiving an indication of one or more GPU buffers that contain the one or more composited layers, and wherein the means for fetching the one or more composited layers further comprises means for fetching the one or more composited layers from the one or more GPU buffers.

25. A non-transitory computer-readable storage medium having instructions stored thereon for performing a method for generating a frame, the method comprising: receiving a first fence indicating that a first frame stored in a display processor unit (DPU) buffer has been consumed by a hardware component; in response to receiving the first fence, fetching a plurality of layers from an application buffer, the plurality of layers corresponding to a second frame; determining to use both a DPU and a graphics processing unit (GPU) to process the plurality of layers for composition of the second frame; based on the determination to use the DPU and the GPU to process the plurality of layers: fetching the first fence from the DPU buffer; and generating a second fence; initiating a GPU process for compositing one or more layers from a subset of the plurality of layers, the GPU process initiated in response to generating the second fence; initiating a DPU process for compositing remaining layers of the plurality of layers and the one or more composited layers to generate the second frame, the DPU process initiated in response to fetching the first fence; receiving a third fence indicating completion of the one or more composited layers; in response to receiving the third fence: fetching, by the DPU process, the one or more composited layers; and generating, by DPU process, the second frame based on the one or more composited layers and the remaining layers; and providing the second frame to the hardware component.

26. The non-transitory computer-readable storage medium of aspect 25, wherein initiating the GPU process comprises configuring GPU parameters for compositing the one or more layers prior to the GPU process, and wherein initiating the DPU process comprises configuring DPU parameters for compositing the remaining layers of the plurality of layers and the one or more composited layers prior to the DPU process.

27. The non-transitory computer-readable storage medium of any of aspects 25 and 26, wherein the second fence comprises a time duration indicative of a period during which the compositing of the one or more layers is pending, and wherein the third fence is configured to interrupt the period and initiate the compositing of the one or more layers.

28. The non-transitory computer-readable storage medium of any of aspects 25-27, wherein determining to use both the DPU and the GPU to process the plurality of layers for composition of the second frame further comprises determining which of the plurality of layers form the subset of the plurality of layers.

29. The non-transitory computer-readable storage medium of any of aspects 25-28, wherein generating the second frame further comprises: storing the second frame in the DPU buffer; and setting a fourth fence indicating release of the second frame by the DPU.

30. The non-transitory computer-readable storage medium of any of aspects 25-29, wherein the first fence is a memory value set by the DPU indicating release of the first frame by the DPU.

Additional Considerations

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for" or simply as a "block" illustrated in a figure.

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. The software may be stored on non-transitory computer-readable medium included in the processing system.

Accordingly, in one or more examples, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method for generating a frame, comprising:
    receiving a first fence indicating that a first frame stored in a display processor unit (DPU) buffer has been consumed by a hardware component;
    in response to receiving the first fence, fetching a plurality of layers from an application buffer, the plurality of layers corresponding to a second frame;
    determining to use both a DPU and a graphics processing unit (GPU) to process the plurality of layers for composition of the second frame;
    based on the determination to use the DPU and the GPU to process the plurality of layers:
        fetching the first fence from the DPU buffer; and
        generating a second fence;
    initiating a GPU process for compositing one or more layers from a subset of the plurality of layers, the GPU process initiated in response to generating the second fence;
    initiating a DPU process for compositing remaining layers of the plurality of layers and the one or more composited layers to generate the second frame, the DPU process initiated in response to fetching the first fence;
    receiving a third fence indicating completion of the one or more composited layers;
    in response to receiving the third fence:
        fetching, by the DPU process, the one or more composited layers; and
        generating, by DPU process, the second frame based on the one or more composited layers and the remaining layers; and
    providing the second frame to the hardware component.

2. The method of claim 1, wherein initiating the GPU process comprises configuring GPU parameters for compositing the one or more layers prior to the GPU process, and wherein initiating the DPU process comprises configuring DPU parameters for compositing the remaining layers of the plurality of layers and the one or more composited layers prior to the DPU process.

3. The method of claim 1, wherein the second fence comprises a time duration indicative of a period during which the compositing of the one or more layers is pending, and wherein the third fence is configured to interrupt the period and initiate the compositing of the one or more layers.

4. The method of claim 1, wherein determining to use both the DPU and the GPU to process the plurality of layers for composition of the second frame further comprises determining which of the plurality of layers form the subset of the plurality of layers.

5. The method of claim 1, wherein generating the second frame further comprises:
    storing the second frame in the DPU buffer; and
    setting a fourth fence indicating release of the second frame by the DPU.

6. The method of claim 1, wherein the first fence is a memory value set by the DPU indicating release of the first frame by the DPU.

7. The method of claim 1, wherein the third fence is received during initiating the DPU process.

8. The method of claim 1, wherein receiving the third fence indicating completion of the one or more composited layers further comprises receiving an indication of one or more GPU buffers that contain the one or more composited layers, and wherein fetching the one or more composited layers further comprises fetching the one or more composited layers from the one or more GPU buffers.

9. An apparatus configured for generating a frame, the apparatus comprising:
 a memory; and
 a processor coupled to the memory, the processor and the memory configured to:
  receive a first fence indicating that a first frame stored in a display processor unit (DPU) buffer has been consumed by a hardware component;
  fetch, in response to receiving the first fence, a plurality of layers from an application buffer, the plurality of layers corresponding to a second frame;
  determine to use both a DPU and a graphics processing unit (GPU) to process the plurality of layers for composition of the second frame;
  based on the determination to use the DPU and the GPU to process the plurality of layers:
   fetch the first fence from the DPU buffer; and generate a second fence;
   initiate a GPU process for compositing one or more layers from a subset of the plurality of layers, the GPU process initiated in response to generating the second fence;
  initiate a DPU process for compositing remaining layers of the plurality of layers and the one or more composited layers to generate the second frame, the DPU process initiated in response to fetching the first fence; and
  receive a third fence indicating completion of the one or more composited layers;
  in response to receiving the third fence:
   fetch, by the DPU process, the one or more composited layers; and
   generate, by DPU process, the second frame based on the one or more composited layers and the remaining layers; and
  provide the second frame to the hardware component.

10. The apparatus of claim 9,
 wherein the processor and the memory, being configured to initiate the GPU process, are further configured to determine GPU parameters for compositing the one or more layers prior to the GPU process, and
 wherein the processor and the memory, being configured to initiate the DPU process, are further configured to determine DPU parameters for compositing the remaining layers of the plurality of layers and the one or more composited layers prior to the DPU process.

11. The apparatus of claim 9, wherein the second fence comprises a time duration indicative of a period during which the compositing of the one or more layers is pending, and wherein the third fence is configured to interrupt the period and initiate the compositing of the one or more layers.

12. The apparatus of claim 9, wherein the processor and the memory, being configured to determine to use both the DPU and the GPU to process the plurality of layers for composition of the second frame, are further configured to determine which of the plurality of layers form the subset of the plurality of layers.

13. The apparatus of claim 9, wherein the processor and the memory, being configured to generate the second frame, are further configured to:
 store the second frame in the DPU buffer; and
 set a fourth fence indicating release of the second frame by the DPU.

14. The apparatus of claim 9, wherein the first fence is a memory value set by the DPU indicating release of the first frame by the DPU.

15. The apparatus of claim 9, wherein the third fence is received during initiating the DPU process.

16. The apparatus of claim 9,
 wherein the processor and the memory, being configured to receive the third fence indicating completion of the one or more composited layers, are further configured to receive an indication of one or more GPU buffers that contain the one or more composited layers, and
 wherein the processor and the memory, being configured to fetch the one or more composited layers, are further configured to fetch the one or more composited layers from the one or more GPU buffers.

17. An apparatus for generating a frame, the apparatus comprising:
 means for receiving a first fence indicating that a first frame stored in a display processor unit (DPU) buffer has been consumed by a hardware component;
 means for fetching a plurality of layers from an application buffer in response to receiving the first fence, the plurality of layers corresponding to a second frame;
 means for determining to use both a DPU and a graphics processing unit (GPU) to process the plurality of layers for composition of the second frame;
 means for fetching the first fence from the DPU buffer based on the determination to use the DPU and the GPU to process the plurality of layers;
 means for generating a second fence based on the determination to use the DPU and the GPU to process the plurality of layers;
 means for initiating a GPU process for compositing one or more layers from a subset of the plurality of layers in response to generating the second fence;
 means for initiating a DPU process for compositing remaining layers of the plurality of layers and the one or more composited layers to generate the second frame, the DPU process initiated in response to fetching the first fence;
 means for receiving a third fence indicating completion of the one or more composited layers;
 means for fetching, by the DPU process, the one or more composited layers in response to receiving the third fence;
 means for generating, by DPU process, the second frame based on the one or more composited layers and the remaining layers in response to receiving the third fence; and
 means for providing the second frame to the hardware component.

18. The apparatus of claim 17,
 wherein the means for initiating the GPU process comprises means for configuring GPU parameters for compositing the one or more layers prior to the GPU process, and
 wherein the means for initiating the DPU process comprises means for configuring DPU parameters for compositing the remaining layers of the plurality of layers and the one or more composited layers prior to the DPU process.

19. The apparatus of claim 17, wherein the second fence comprises a time duration indicative of a period during which the compositing of the one or more layers is pending, and wherein the third fence is configured to interrupt the period and initiate the compositing of the one or more layers.

20. The apparatus of claim 17, wherein the means for determining to use both the DPU and the GPU to process the plurality of layers for composition of the second frame further comprises means for determining which of the plurality of layers form the subset of the plurality of layers.

21. The apparatus of claim 17, wherein the means for generating the second frame further comprises:
 means for storing the second frame in the DPU buffer; and
 means for setting a fourth fence indicating release of the second frame by the DPU.

22. The apparatus of claim 17, wherein the first fence is a memory value set by the DPU indicating release of the first frame by the DPU.

23. The apparatus of claim 17, further comprising means for receiving the third fence during initiating the DPU process.

24. The apparatus of claim 17,
 wherein the means for receiving the third fence indicating completion of the one or more composited layers further comprises means for receiving an indication of one or more GPU buffers that contain the one or more composited layers, and
 wherein the means for fetching the one or more composited layers further comprises means for fetching the one or more composited layers from the one or more GPU buffers.

25. A non-transitory computer-readable storage medium having instructions stored thereon for performing a method for generating a frame, the method comprising:
 receiving a first fence indicating that a first frame stored in a display processor unit (DPU) buffer has been consumed by a hardware component;
 in response to receiving the first fence, fetching a plurality of layers from an application buffer, the plurality of layers corresponding to a second frame;
 determining to use both a DPU and a graphics processing unit (GPU) to process the plurality of layers for composition of the second frame;
 based on the determination to use the DPU and the GPU to process the plurality of layers:
  fetching the first fence from the DPU buffer; and
  generating a second fence;
 initiating a GPU process for compositing one or more layers from a subset of the plurality of layers, the GPU process initiated in response to generating the second fence;
 initiating a DPU process for compositing remaining layers of the plurality of layers and the one or more composited layers to generate the second frame, the DPU process initiated in response to fetching the first fence;
 receiving a third fence indicating completion of the one or more composited layers;
 in response to receiving the third fence:
  fetching, by the DPU process, the one or more composited layers; and
  generating, by DPU process, the second frame based on the one or more composited layers and the remaining layers; and
 providing the second frame to the hardware component.

26. The non-transitory computer-readable storage medium of claim 25, wherein initiating the GPU process comprises configuring GPU parameters for compositing the one or more layers prior to the GPU process, and wherein initiating the DPU process comprises configuring DPU parameters for compositing the remaining layers of the plurality of layers and the one or more composited layers prior to the DPU process.

27. The non-transitory computer-readable storage medium of claim 25, wherein the second fence comprises a time duration indicative of a period during which the compositing of the one or more layers is pending, and wherein the third fence is configured to interrupt the period and initiate the compositing of the one or more layers.

28. The non-transitory computer-readable storage medium of claim 25, wherein determining to use both the DPU and the GPU to process the plurality of layers for composition of the second frame further comprises determining which of the plurality of layers form the subset of the plurality of layers.

29. The non-transitory computer-readable storage medium of claim 25, wherein generating the second frame further comprises:
 storing the second frame in the DPU buffer; and
 setting a fourth fence indicating release of the second frame by the DPU.

30. The non-transitory computer-readable storage medium of claim 25, wherein the first fence is a memory value set by the DPU indicating release of the first frame by the DPU.

* * * * *